2,957,855

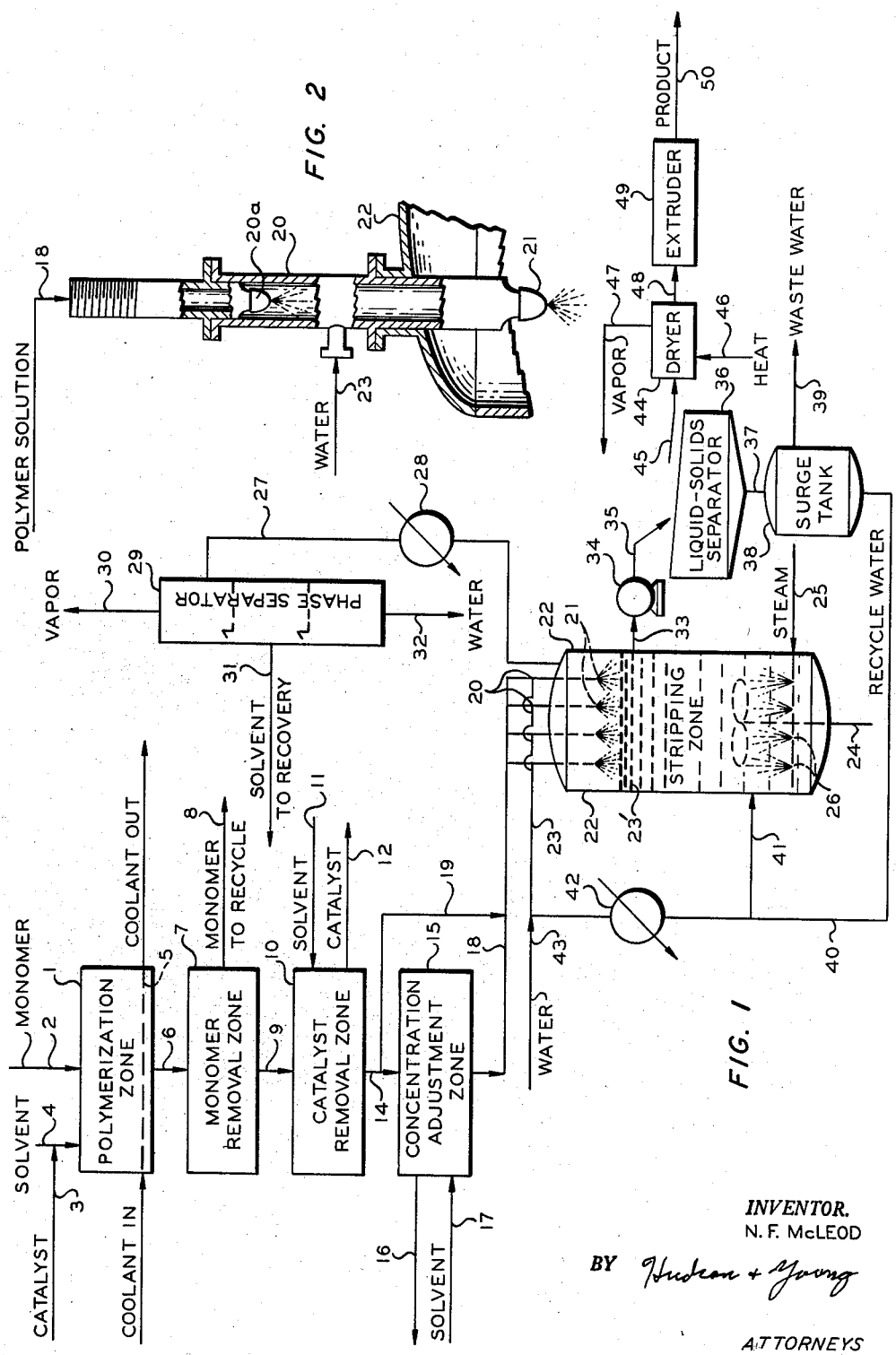

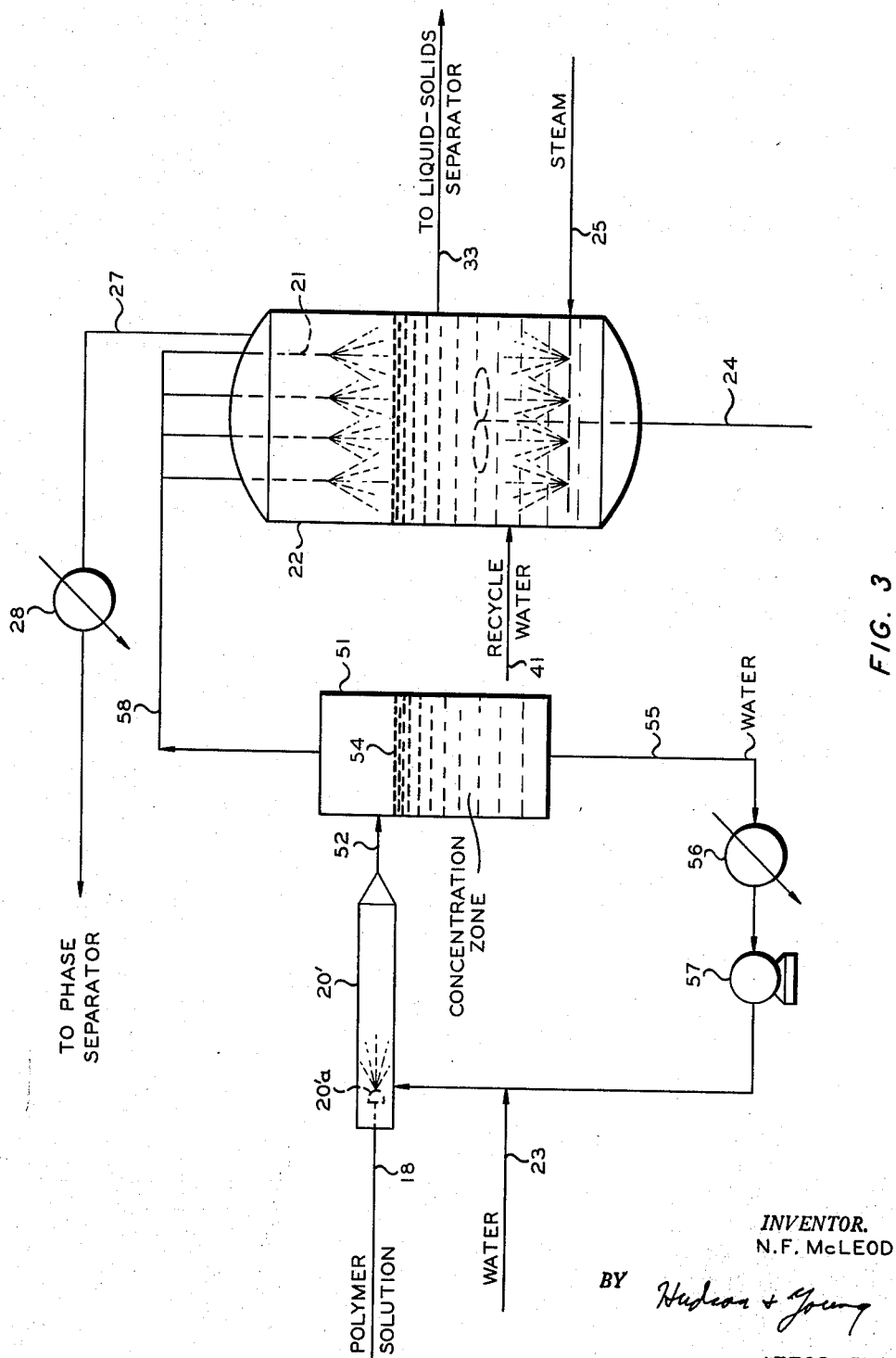

PROCESS FOR RECOVERING POLYMERS OF 1-OLEFINS FROM HYDROCARBON SOLUTIONS

Norman F. McLeod, Borger, Tex., assignor to Phillips Petroleum Company, a corporation of Delaware Filed Nov. 13, 1959, Ser. No. 852,900

16 Claims. (Cl. 260—88.2)

This invention relates to a novel process for the recovery of polymers of 1-olefins from a hydrocarbon solution thereof.

This application is a continuation-in-part of my copending application Serial No. 590,565, filed June 11, 1956, now abandoned.

The method of this invention is applicable to recovery of 1-olefin polymers from solvents broadly. It has particular application to recovery of solid polymers from the solvent used in the polymerization of said 1-olefins.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the patent of Hogan et al., Patent 2,825,721, issued March 4, 1958, a process is disclosed for producing novel polymers of 1-olefins by carrying out the polymerization at a temperature in the range of 100 to 500° F. in the presence of 0.1 to 10 or more weight percent of chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as chromium oxide on a silica-alumina support such as 90 percent silica-10 percent alumina. This catalyst is ordinarily a highly oxidized catalyst which has been activated by high-temperature treatment under non-reducing conditions and preferably in an oxidizing gas. Olefins other than 1-olefins as described are polymerized by the action of this catalyst but such polymers are often preponderantly normally liquid at least when polymerized under the described conditions. The polymerization is suitably carried out in the liquid phase such as in solution in a hydrocarbon solvent, especially a paraffin or naphthene which is liquid under the polymerization conditions; however, vapor phase operation or mixed phase operation can be effected. Also, diolefins can be polymerized by the chromium oxide catalyst to product solid polymers. As has been indicated, this invention is applicable to recovery of polymeric 1-olefins from solution and is particularly applicable to recovery of polymer from the solvent as prepared by the above preferred method. However, such polymers as prepared by other catalyst systems can be recovered by the process of this invention, e.g., those prepared by the organo-metallic catalysts disclosed by Belgian Patent 533,362, November 16, 1954, by Karl Ziegler.

These polymers of 1-olefins have been separated from hydrocarbon solvents by simple vacuum flashing, but this method produces a low bulk density and fibrous material. This material is difficult to handle and is unsuitable for certain uses. For example, when thin films are prepared from such material, it tends to result in an excessive quantity of "fish eyes." These "fish eyes" are believed to be due to difference in crystalline form, or possibly due to segregation of material of different molecular weight, or both. Regardless of the cause, the film is not homogeneous and is, therefore, objectionable to the trade. This fibrous material has a bulk density of approximately one pound per cubic foot is difficult to handle and to dry completely. For example, extrusion equipment cannot be easily operated with such a low density material. Further, the polymer, even if suitable for the intended purpose, still contains an appreciable amount of solvent. Drying of this material is a problem in that the removal of combustible vapors in conventional drying equipment is somewhat hazardous.

In the copending application of R. G. Wallace, filed February 3, 1958 and having Serial No. 712,908, a novel process is disclosed and claimed for the recovery of polymeric 1-olefins from solutions thereof. In the preferred operation of that invention, a hot hydrocarbon solution of polymeric 1-olefins having a concentration in the range of 1 to 8 weight percent polymer is dispersed in 1 to 5 volumes of cool water per volume of solution so as to obtain a temperature below the precipitation temperature of the polymer while maintaining sufficient pressure on the system to maintain the solvent and water in substantially the liquid phase. More preferably, the concentration of polymer in solvent is in the range of 2 to 5 weight percent. The important thing is to cause the polymer to precipitate while the solvent and water are in the liquid state, i.e. before any substantial vaporization is permitted. The dispersion is then introduced into a stream stripping zone containing hot water and the solvent is flashed off.

I have found that the way the dispersion is introduced into the stream stripping zone is very important. By some prior art methods, this steam stripping zone preferably operates at sufficiently high temperatures that not only is the solvent readily evaporated, but the polymer is softened in the presence of hydrocarbon solvents and if the dispersion is introduced directly into the hot water at an undesirably high temperature, the polymer particles tend to agglomerate forming balls or the polymer collects as a large globule on the agitator in the steam stripper. Since the polymer will float in water, agitation is required, if solvent is to be completely displaced. When spraying the solution above the water, care must be taken to avoid the spray coming in contact with the vessel wall, otherwise, polymer will stick and build up on such walls. It is also desirable to keep each spray, where a plurality of sprays are utilized, separate to avoid interference with drying action and in order to obtain good dispersion.

One object of this invention, therefore, is to provide an improved method of separating polymer from solvent;

Still another object of this invention is to provide a method of preventing polymer build up in the separation system; and, Still other objects, advantages and features of this invention will be apparent to those skilled in the art having been given the disclosure.

According to the invention, hot polymer solution is first dispersed in cool water to precipitate polymer and the resulting three phase dispersion, water, solvent and polymer, is sprayed above but directly into hot water at lower pressure so as to evaporate a portion of the solvent while the spray is passing through the vapor space and displacing and evaporating the remaining solvent from the liquid zone.

As previously indicated, the polymeric materials to which this invention is particularly applicable are polymers of 1-olefins. Polymers of 1-olefins containing 2 to 8 carbon atoms and having no branching nearer the double bond than the 4-position have been found in recent years to have superior heat resistance and low temperature properties when produced at relatively low temperatures and pressures. The above-identified method of Hogan et al. is one such low temperature-low pressure method. As indicated above, it is preferable to carry out the polymerization in a hydrocarbon solvent. This invention has particular use in recovering the polymer from the solvent.

Examples of the preferred 1-olefins include ethylene, propylene, 1-butene, 1-pentene, 1-hexene, 1-octene, 4-methyl-1-pentene, 4-methyl-1-hexene, 5-methyl-1-heptene, 6-methyl-1-heptene, and the like.

The solvents especially useful in polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are a solvent for the polymer at the temperature in the polymerization range are suitable. Any hydrocarbon which is relatively inert, non-deleterious, and liquid under the operating conditions of the process can be utilized. Diluents that have been used successfully in the polymerization reaction and are operable in this invention include propane, isobutane, normal pentane, isopentane, isooctane (2,2,4-trimethylpentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable in the present invention.

In the preferred operation of this invention, one volume of a hot polymer solution having a concentration in the range of 1 to 8 percent polymer, more preferably in the range of 2 to 5 weight percent, is dispersed in 1 to 5 volumes of cool water having a temperature wherein the resulting dispersion will have a temperature below the precipitation temperature of the polymer and wherein both the solvent and water will be maintained in substantially liquid phase and the resulting three phase dispersion is then sprayed through a vapor zone of reduced pressure directly into hot water of sufficient temperature to evaporate said solvent. It should be understood that this invention is applicable to other concentrations, both higher and lower, and is operable with other water to solution ratios. Preferably the spray nozzles will be at least 1 foot above the water level and generally will not be more than 3 feet above said water level. However, with sufficiently low pressure and/or high temperature, the solvent is flashed out of dispersion almost immediately and very short distances, e.g. 6 inches, are operable. In general, a maximum of three foot spacing above the liquid level will be used, however, greater distances can be employed if desired. At greater heights, the spray has more room to spread out and to come into contact with the vessel walls which should be avoided. Also, it is preferable to have the spray of sufficient force to penetrate the liquid surface. The hot water should be agitated (stirred) since the polymer tends to float and it is desirable to spray the droplets into liquid and not into a layer of polymer particles.

As has been indicated, when a high bulk density, granular polymer is desired, the residence time in the dispersion zone must be sufficient to allow the polymer to completely harden. This time will be dependent upon the final mix temperature. For example, when recovering polyethylene prepared by the Hogan et al. method in cyclohexane with a final mix temperature of 105–115° F., time in the range 4 to 8 seconds is sufficient. On the other hand, with a final mix temperature in the range 140–148° F., the residence time should be in the range 30 to 35 seconds. As the final mix temperature approaches the precipitation temperature of the polymer, the time required becomes longer. As a practical consideration the maximum final temperature will generally not exceed about 150° F. and the residence time will not generally exceed about 60 seconds. With other polymers, these temperatures and times may vary, however, having been given this disclosure, it is within the skill of the art to determine the time and temperature required. However, it is not always necessary that the polymer be of the high bulk density type and fibrous material can be tolerated or even desired. In this case, the dispersion temperature and time need be only regulated so as to cause the polymer to precipitate. This embodiment is especially useful wherein it is desired to keep the stripping load on the polymer recovery system to a minimum.

By the processing of this invention, the solvent is essentially removed prior to the drying step and the advantage of obtaining a polymer free of combustibles prior to drying is obtained regardless of the physical nature of the polymer. The high bulk density in addition to being especially suitable for preparing film free of "fish eyes" is also more easily handled, dried and further processed such as by compacting by extrusion. In the case of polymers including copolymers, of ethylene, a bulk density of at least 10 pounds per cubic foot and higher, say up to 20 pounds, is frequently desired.

When operating with polyethylene in cyclohexane, a stripper temperature of 170° F. at atmospheric pressure or 140° F. at 7 p.s.i.a. is satisfactory. It is within the skill of the art to determine a proper temperature for any given pressure and solvent. This temperature will, hereinafter and in the claims, be referred to as the vaporization temperature of the solvent.

I have found this invention especially useful in recovering polymers of ethylene prepared by the method of Hogan et al. and precipitated from solution by the method of Wallace. I will further describe my invention in conjunction with one such commercial process. However, it should be understood that this method is equally applicable to 1-olefin polymers other than polyethylene and to solvents other than cyclohexane with proper adjustment of temperatures, pressures, etc.

This invention can best be described by reference to the drawings attached hereto and forming a part of this specification.

Figure 1 is a schematic flow diagram of a process for producing polymeric 1-olefins incorporating this invention;

Figure 2 is a schematic cross-sectional view showing one dispersion nozzle and spraying nozzle arrangement; and Figure 3 is a schematic flow diagram of an alternative nozzle arrangement.

Referring now to the drawings, a feed stream consisting essentially of ethylene is passed to polymerization zone 1 via conduit 2. Catalyst in solvent (cyclohexane) is introduced into the polymerization zone via conduits 3 and 4 with additional solvent, if needed, being added via conduit 4. The ingredients in each of these conduits 2, 3 and 4 are preferably at polymerization temperature (290° F.), however, one or more streams can be cooler with the remaining stream warmer so that the resulting dispersion is at the proper temperature. It should also be understood that the ethylene and solvent can be premixed, if desired. The polymerization reaction is exothermic; therefore, it is necessary to remove heat from the polymerization zone. One means for accomplishing this is by indirect heat exchange, for example, by passing cool water through heat exchanger 5. The polymerization zone effluent passes at about 290° F. from zone 1 via conduit 6 to monomer removal zone 7 wherein unreacted ethylene is vaporized and removed via conduit 8 to ethylene recycle. The mixture passes from monomer removal zone 7 via conduit 9 to catalyst removal zone 10 wherein the catalyst is separated from the solution. When catalyst is removed by filtration, the solution is generally diluted to about 3 percent polymer in solvent and the catalyst cake is subsequently washed with fresh solvent so that the effluent from zone 10 has a polymer concentration of 2 to 3 percent. Solvent is added to this zone 10 via conduit 11 and catalyst is removed via conduit 12. The hot solution passes from catalyst removal zone 10 via conduit 14 to concentration adjustment zone 15. In general, the polyethylene concentration in the effluent from zone 10 is relatively low, 2 to 3 percent, and in order to reduce the load on the stripping zone, to be described, a portion of the solvent is removed from the concentration adjustment zone. On the other hand, if the concentration of polymer is too great, the nozzles may become plugged. In general, it is preferable to adjust the concentration to about 3 to 6 percent. If solvent is removed, it passes via conduit 16 to solvent recycle and if solvent is required, it is supplied via conduit 17. In some cases, it may be that the concentration is such that no adjustment is required and the material then passes directly to conduit 18 via conduit 19. In the example, the concentration of the solution is adjusted to about 4.5 percent. In either case, the solution from zone 15 or 10 passes via conduit 18 to dispersion zone 20 and thence to nozzles 21 in stripping zone 22. Water is admitted to dispersion zone 20 via conduit 23. About four volumes of water at 100° F. per volume of solution is introduced via conduit 23 to zone 20 and the solvent is dispersed therein by means of nozzles 20a so that the resulting dispersion is at a temperature within the range of 110 to 150° F. (preferably 110°–130°F.). Since the dispersion is to be reheated, it is preferred to hold the dispersion temperature near the maximum allowable temperature. The pressure in this dispersion zone is held within the range of 35 to 45 pounds per square inch gauge. Figure 2 is an enlargement of this dispersion and spraying zone. In general, a plurality of dispersion and spray zones will be employed as illustrated; however, it is within the scope of this invention to use a single dispersion zone with a plurality of spray zones or to use only a single spray zone. One such alternative method is shown in Figure 3 and will be subsequently described.

In any case, stripping zone 22 has hot water therein to a predetermined level 23' and nozzles 21 are set about 18 inches above this level and are so directed as not to cause spray to contact the walls of the vessel nor to overlap. The hot water at 170° F. and atmospheric pressure is stirred via means of stirrer 24. This stirrer is rotated at a speed preferably in the range of 25 to 200 r.p.m. and in this example at about 85 r.p.m. While any means of supplying heat in the stripping zone can be used, steam is especially effective. Steam from conduit 25 is supplied to the stripping zone 22 via nozzles 26. The three phase dispersion, solid polymer water and solvent enters zone 22 via nozzles 21 with a pressure drop of 35 to 45 pounds per square inch. The bulk of the solvent flashes off and is carried by steam overhead via conduit 27. The small amount of solvent remaining is substantially displaced by hot water in zone 22 and is also evaporated and carried overhead via conduit 27. This mixture of steam and solvent vapor passes to condenser 28 and phase separator 29. Non-condensed vapors are taken overhead from separator 29 via conduit 30, solvent is removed and sent to solvent recovery zone, not shown, via conduit 31 and water is removed and recycled or sent to waste via conduit 32.

The polymer residence time in this stripping zone is in the range of 20 to 30 minutes. Polymer in water slurry is then removed from zone 22 via conduit 33 to pump 34 and conduit 35 to separation zone 36. One convenient means for separating polymer and water is a skimmer tank; however, any suitable means can be employed.

Water from separation zone 36 passes via conduit 37 to surge tank 38. Conduit 39 is provided in surge tank 38 to remove any excess water. The necessity for removing or adding water will be determined by the net loss or gain of water in stripping zone 22. The water in tank 38 will still be at about the temperature of the stripping zone 22, e.g., 170° F., for this example. This hot water is recycled to the system via conduit 40. A portion of this recycle water is returned directly to the stripping zone 22 via conduit 41 and a portion cooled in heat exchanger 42. This cooled water along with any makeup water from conduit 43 is used as cooling water of conduit 23 to dispersion zone 20.

The wet polymer from separator 36, still damp but having the solvent essentially replaced by water, is passed to drying zone 44 via conduit 45. Heating medium is introduced into drying zone 44 via conduit 46. A forced draft dryer using air at 250° F. is satisfactory for this purpose. The moisture is removed from the drying zone 44 via conduit 47. The dried polymer passes via conduit 48 to extruder 49 wherein the polymer is compacted and the polymer product is removed via conduit 50.

Referring to Figure 3, a modification of the process of this invention is shown in this figure. The stripping tank is the same as that described and the same reference numerals are used. However, the dispersion zone 20' and spray zone 21 are separated by a concentration zone 51. This concentration step is fully described and claimed in the copending application of John Mitacek, filed June 11, 1956, and having Serial No. 590,764. The polymer solution from conduit 18 is dispersed via nozzles 20'a into cooler water of zone 20' as previously described. The resulting three phase dispersion then passes via conduit 52 to concentration zone 51, wherein the polymer and solvent tend to float on top of the water forming interface 54. The water from zone 51 is recycled via conduit 55, cooler 56 and pump 57 to dispersion zone 20'. Makeup water is added via conduit 23. The polymer-solvent slurry is passed via conduit 58 to stripping zone 22 and is introduced via nozzles 21 as previously described.

In the above description and in the drawings, valves, etc., are omitted, it being within the skill of the art to supply these. In said description, certain modifications have been indicated, however, those skilled in the art will recognize that many such modifications can be made and still obtain the advantages of this invention. The important features are that the solvent be kept in substantially liquid phase during precipitation of the polymer and that the slurry be sprayed into a chamber above water at a temperature above the vaporization temperature of the solvent.

Frequently an olefin is polymerized in a hydrocarbon such as pentane at a temperature where the polymer is solid as formed. In this latter case, a small amount of polymer is formed which remains soluble in the solvent, and when the polymer is separated from solvent, this soluble material is carried out with the solvent. Also, polymer is frequently recovered by precipitating polymer in solvent and here again a small amount of polymer remains soluble. In both of these latter cases, this soluble polymer can be recovered by the method of this invention. In all of these methods, a small amount of polymer is frequently entrained in solvent and is carried overhead to the solvent recovery systems. Such polymer is advantageously recovered by the method herein described.

The following examples will illustrate preferred embodiments of this invention:

Example 1

Ethylene was polymerized in cyclohexane according to the method of Hogan et al. with the polymerization being carried out with a chromium oxide-silica-alumina catalyst containing approximately 2.5 weight percent chromium. The reactor effluent was subsequently diluted with additional cyclohexane to adjust the polyethylene concentration to 2.8 weight percent. This solution at a temperature of 240° F. was injected into a mix zone such as 20' at the rate of 760 pounds/hour by means of a Binks F-92-97

(hollow cone, non-clog) nozzle such as 20a. Simultaneously, water at 95° F. entered into the mix zone via conduit such as 23 at 1530 pounds per hour. The resulting dispersion temperature was 125° F. and this dispersion was sprayed into a coagulation or stripping tank 22 having 125 gallons of water at 170° F. and atmospheric pressure via a Binks F–110–111 nozzle. This coagulation tank had a diameter of 4 feet and was provided with a stirrer. The tank nozzle was 18 inches above the liquid level. The pressure drop across the dispersion nozzle was 65 p.s.i. and the pressure drop across the tank nozzle was 25 p.s.i. The residence time in the coagulation tank was 20 minutes and the run was continued for 8 hours. The nozzle was so placed that there was some impingement on the tank wall and consequently there was approximately a 1 inch build up of polymer at this point. There was no evidence of any additional build up at any other location. The resulting product was in the form of ¼ to ½ inch strands.

*Example II*

Ethylene and 1-butene are polymerized by the method of Hogan et al. with the polymerization being carried out at a temperature of 240° F., a pressure of approximately 400 p.s.i., with a chromium oxide-silica-alumina catalyst containing approximately 2.5 weight percent chromium of which approximately 2 percent is hexavalent chromium. The olefin feed comprises 15 weight percent 1-butene and 85 weight percent ethylene and the polymerization diluent is cyclohexane. The reaction effluent comprising 8 weight percent polymer is subsequently diluted with additional cyclohexane to adjust the copolymer concentration to 3.5 percent. The copolymer is then separated from the diluent by the method of the present invention. The solution at a temperature of 240° F. is injected into a mix zone at the rate of 250 pounds per hour by means of a dispersion nozzle. Simultaneously water at 90° F. is passed into the mix zone at 400 pounds per hour. The resulting dispersion temperature is 115° F. and this dispersion is sprayed into the vapor space of a stripping zone containing water at 140° F. and 7 p.s.i.a. by means of a second nozzle. The pressure drop across the dispersion nozzle is 75 p.s.i. and the pressure drop across the tank nozzle is 50 p.s.i. The residence time in the stripping tank is 30 minutes. A slurry of granular copolymer particles in water is removed from the stripping tank and passed to additional processing steps.

Having thus described the invention by providing specific examples thereof, it is to be understood that no undue limitations or restrictions are to be employed, by reason thereof many variations or modifications are within the scope of the invention, and although certain embodiments have been disclosed herein, this invention is not to be limited thereby.

I claim:

1. In the process of separating polymeric 1-olefins from hydrocarbon solution thereof, the improvement comprising dispersing said solution into water of lower temperature at a solution-to-water ratio that the resulting dispersion temperature is below the precipitation temperature of the 1-olefin polymer, said dispersion being carried out under conditions to maintain said hydrocarbon and water in substantially liquid phase and thereafter spraying the resulting three phase dispersion through a vapor space into water maintained at a temperature above the vaporization temperature of said solvent.

2. The process of claim 1 wherein the polymeric olefin is polyethylene.

3. The process of claim 1 wherein the polymeric olefin is a copolymer of ethylene and at least one other 1-olefin of 2 to 8 carbon atoms.

4. A process for separating polymers of 1-olefins of 2 to 8 carbon atoms from hot hydrocarbon solutions thereof, said process comprising dispersing said solution into cool water so as to lower the temperature of said solution to below the precipitation temperature of said polymeric 1-olefin and under condition of pressure to maintain solvent and water in substantially liquid phase and spraying the resulting three phase dispersion through a vapor zone having a temperature above the vaporization temperature of the hydrocarbon solvent, thereby flashing a portion of said solvent, and into a hot water zone having a temperature above the vaporization temperature of said solvent.

5. A process for separating polymers of 1-olefins of 2 to 8 carbon atoms from hot hydrocarbon solutions thereof, said process comprising dispersing said hot solution into cool water within the range of 1 to 5 volumes per volume of solution so as to obtain a dispersion at a temperature wherein said polymeric 1-olefin precipitates, maintaining the hydrocarbon solvent and water in substantially liquid phase until the polymer is substantially precipitated, spraying the resulting dispersion as fine droplets through a vapor space into water under conditions wherein the hydrocarbon solvent is flashed.

6. The process of claim 5 wherein said hydrocarbon solution has a concentration within the range of 2 to 5 weight percent and said vapor space has a depth of at least 6 inches.

7. A process for recovering polymers of 1-olefins of 2 to 8 carbon atoms as relatively high bulk density material from hot hydrocarbon solutions thereof, said process comprising dispersing said hot solution into cool water in a volume ratio that the resulting dispersion temperature is below the softening temperature of said polymer, controlling the resulting pressure and temperature relationship so as to maintain said hydrocarbon and said water in liquid phase until said polymer is substantially precipitated, spraying the resulting dispersion as fine droplets through a vapor space wherein a portion of the hydrocarbon solvent is flashed directly into hot water wherein the remaining solvent is removed, and thereafter recovering polymer from water.

8. The process of claim 7 wherein the polymer is polyethylene.

9. The process of claim 7 wherein the polymer is a copolymer of ethylene and at least one other 1-olefin of 2 to 8 carbon atoms.

10. The process of claim 7 wherein the polymer is a copolymer of ethylene and 1-butene.

11. A process for recovering polyethylene as relatively high density material from hot solution thereof in a solvent selected from the group consisting of paraffins and cycloparaffins, said process comprising dispersing said hot solution into cooler water at a ratio within the range of 1 to 5 volumes water per volume of solution and at a temperature wherein the resulting dispersion temperature is below the softening temperature of the polyethylene in the presence of said solvent, maintaining the pressure on said dispersion so as to maintain said solvent and water in liquid phase until said polyethylene is substantially precipitated, spraying the resulting three phase dispersion through a vapor zone under temperature and pressure conditions wherein solvent is vaporized and into water above the vaporization temperature of said solvent, and thereafter separating polymer from said water.

12. A process for recovering polyethylene as a relatively high bulk density material from a hot solution thereof in cyclohexane, said process comprising adjusting the concentration of said solution to a concentration within the range of 2 to 5 weight percent polyethylene, dispersing the resulting hot solution in cooler water in a volume ratio within the ratio of 1 to 5 volumes water per volume of solution, the temperature of said cool water being such that the resulting dispersion has a resulting temperature not higher than 130° F., maintaining the pressure on said cyclohexane and water in liquid phase until said polyethylene is precipitated, passing the resulting three phase dispersion to an agitated steam stripping zone containing hot water therein below a vapor phase, maintaining a lower pressure in said agitated steam stripping zone than is maintained in said dispersion and at a temperature above the vaporization temperature of cyclohexane, introducing said dispersion as a fine spray into said vapor phase of said steam stripping zone so said droplets fall directly into said hot water, stirring the precipitated polymer in said hot water while passing steam through the stirred dispersion, and thereafter separating polymer from said hot water.

13. In the process for preparing polymeric 1-olefins in relatively high bulk density which comprises polymerizing at least one 1-olefin of 2 to 8 carbon atoms per molecule and having no branching nearer the double bond than the four-position in a hydrocarbon solution, said hydrocarbon being selected from the group consisting of paraffins and cycloparaffins of 3 to 12 carbon atoms per molecule in the presence of 0.1 to 10 weight percent of a chromium oxide catalyst comprising a substantial amount of hexavalent chromium, said catalyst being associated with 90 to 99.9 percent of a porous oxide selected from the group consisting of silica, alumina, zirconia and thoria, said polymerization being carried out at a temperature in the range of 150 to 450° F. and above that at which solid polymer is precipitated and at a pressure sufficient to maintain the reactants and solvent in liquid phase, separating unreacted 1-olefins from the resulting polymeric solution, separating catalyst from resulting polymeric solution, adjusting the concentration of the resulting polymeric solution to obtain a 2 to 5 percent polymer solution, the improvement comprising dispersing the last mentioned solution into cool water in a volume ratio of 1 to 5 volumes water per volume of solution so as to obtain a dispersion having a temperature below that at which polymer is precipitated and below that at which the resulting precipitate is soft, maintaining sufficient pressure on the resulting dispersion to maintain said solvent and said water in liquid phase until said polymer substantially reaches the dispersion temperature, introducing the resulting cool dispersion as finely divided droplets into a vapor zone of reduced pressure below that at which said dispersion is maintained and at a temperature above the vaporization temperature of said hydrocarbon solvent so as to flash a portion of said solvent, passing said droplets into an agitated hot water zone having a temperature above the vaporization temperature of said solvent, passing steam through the resulting dispersion of polymer in hot water, and separating the polymer from said hot water.

14. The process of claim 13 wherein said 1-olefin is ethylene, said solvent is cyclohexane, the polymerization temperature is at least 270° F., the resulting three phase dispersion temperature is not greater than 130° F., the vapor phase and hot water temperature is at least 170° F. and the pressure of said vapor phase is approximately atmospheric.

15. The process of claim 13 wherein said 1-olefin is a mixture of ethylene and 1-butene, said solvent is cyclohexane, the polymerization temperature is at least 240° F., the resulting three phase dispersion temperature is not greater than 130° F., the vapor phase and hot water temperature is at least 140° F. and the pressure of said vapor phase is at least 7 p.s.i.a.

16. The process of claim 14 wherein the said three phase dispersion has a portion of water removed prior to introducing the dispersion to said vapor phase.

References Cited in the file of this patent

UNITED STATES PATENTS

| | | |
|---|---|---|
| 2,691,647 | Field et al. | Oct. 12, 1954 |
| 2,710,854 | Seelig | June 14, 1955 |

FOREIGN PATENTS

| | | |
|---|---|---|
| 609,560 | Great Britain | Oct. 4, 1948 |